(12) United States Patent
Hoenes et al.

(10) Patent No.: US 6,879,914 B2
(45) Date of Patent: Apr. 12, 2005

(54) DISTANCE-MEASURING DEVICE

(75) Inventors: Frank Hoenes, Ditzingen (DE); Ulrich Krause, Duisburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/745,791

(22) Filed: Dec. 23, 2003

(65) Prior Publication Data
US 2004/0167718 A1 Aug. 26, 2004

(30) Foreign Application Priority Data
Dec. 24, 2002 (DE) ........................................ 102 61 018

(51) Int. Cl.⁷ .............................. G01S 17/10; B60Q 1/00
(52) U.S. Cl. ....................................... 701/301; 340/435
(58) Field of Search ............................... 701/1, 36, 93, 701/96, 300–302; 340/425.5, 435–437, 932.2

(56) References Cited

U.S. PATENT DOCUMENTS 6,204,753 B1 * 3/2001 Schenk et al. ............... 340/435
2002/0005779 A1 * 1/2002 Ishii et al. .................... 340/436

* cited by examiner

Primary Examiner—Thu V. Nguyen
(74) Attorney, Agent, or Firm—Kenyon & Kenyon

(57) ABSTRACT

A distance-measuring device is used for measuring a distance between a vehicle and an obstacle. In so doing, dimensions of additional parts that are to be mounted on the vehicle and that project into a space between a detecting device for the distance measurement and the obstacle are taken into account.

11 Claims, 2 Drawing Sheets

DISTANCE-MEASURING DEVICE

BACKGROUND INFORMATION

Distance-measuring systems in motor vehicles for supporting parking, in which sensors for measuring distance are arranged on the vehicle, are already known. The sensors are implemented in particular as ultrasonic sensors which send out an ultrasonic signal to an obstacle that is reflected again from the obstacle. The distance between the ultrasonic sensor and the obstacle is then determined from the propagation time. The sensors for measuring distance are preferably integrated in a bumper of the vehicle, so that the distance between the bumper and the obstacle is determined. In measuring, on the one hand, direct measurements may be carried out in which the transmitting sensor itself senses the reflective signal again. On the other hand, cross measurements are also possible in which a different sensor senses the reflected signal. If the obstacle is getting closer to the vehicle, corresponding distance information is output to the driver indicating the obstacle to the driver. Optionally, a warning for the different bumpers or for different sides of the vehicle may in each case be transmitted independently of each other to the driver, so that he/she additionally receives information about the direction from which the obstacle is approaching the vehicle. In general, the minimal distance between the vehicle and the obstacle is calculated and output. Particularly in response to too great an approach to the obstacle beyond a predefined minimum distance, the driver is warned visually and/or acoustically, in order to avoid a collision of the vehicle with the obstacle. On one hand, the minimum distance is a function of the installation geometry of the sensors and their measuring range or their visibility window. Thus, for example, obstacles located very close to the vehicle may lie in a dead angle of the sensor, so that they cannot be detected. Therefore, the minimum distance is permanently predefined and contains a safety distance that helps to reliably prevent a collision of the vehicle with the obstacle. However, if the user makes structural changes on the vehicle, the minimum distance remains unchanged, so that the vehicle may collide with an obstacle without the driver being warned by the distance-measuring device.

SUMMARY OF THE INVENTION

The distance-measuring device of the present invention has the advantage that the dimensions of parts which are mounted on the vehicle and which extend into a spatial area between a detecting device and the obstacle are taken into account when determining the distance between the vehicle and the obstacle. The driver is thereby relieved when parking of independently having to separately calculate in the extension of those parts mounted on the vehicle which jut out beyond the remaining vehicle contour. On one hand, these may be vehicle parts themselves, add-ons to the vehicle, but also parts merely being transported by the vehicle. They are, in particular, such parts able to be mounted on the vehicle which do not belong to the vehicle body as such, and which are either arranged as removable mass-produced components on the vehicle that are later mounted as additional equipment on the vehicle, or which are optionally secured in a removable fashion on or in the vehicle for a temporary time. To be understood here are components which are not necessary for the driving function of the vehicle and which in general offer an additional use to the user that is not necessary for all users of the vehicle, at least not for the entire usage duration. Examples for this are, for instance, a spare wheel additionally positioned on the back of the vehicle, a bicycle likewise situated on the back of the vehicle, particularly in the case of buses or minibuses, a trailer hitch, a load jutting out beyond the vehicle contour such as a special luggage rack or a piece of luggage protruding out of the trunk or a tailgate, or a projecting plate such as a license plate or a warning plate. When using the distance-warning device of the present invention, the driver can be certain that the minimum distance to be observed by him/her between the parts additionally mounted on the vehicle, and therefore between the vehicle, and an obstacle is maintained during a driving maneuver. To this end, it is equally possible for the minimum distance to be observed to be increased by an evaluation unit, or, with the same effect, for the measured distance between the detecting device and the obstacle to be reduced correspondingly by calculation so that a warning of an equal nature may be output to a driver.

It is particularly advantageous for a sensor to automatically detect the mounting of the part projecting beyond the vehicle contour and into the space between the detecting device and the obstacle. In this manner, the distance-measuring device is able to determine the distance so that, on one hand, the full maneuvering capability of the vehicle may be utilized when the part is not mounted, while on the other hand, a possible collision can be avoided.

It is particularly advantageous to equip the detecting device with a plurality of individual sensors whose data may be evaluated both individually and separately. On one hand, a larger spatial area may thereby be covered, and on the other hand, it is also advantageously possible to link the measurement data of different sensors to one another in order to increase the resolution and, in particular, to spatially locate an obstacle or determine the shape of the obstacle.

It is also advantageous to assign zones to the individual sensors, so that as a function of the part projecting into the space between the detecting device and the obstacle, each zone may be assigned a corresponding offset value that is subtracted from the distance measured between the detecting device and the obstacle or that is added to a minimum distance to be observed in the respective zone. The evaluation by calculation is thereby simplified to the effect that a specific distance value does not have to be determined for each spatial coordinate, but rather only for each zone. In particular, a smooth transition between distance boundaries makes it possible to avoid irregularities in the detection curve and therefore fluctuating measuring results in the display for the distance warning provided for the driver.

DETAILED DESCRIPTION

The present distance-measuring device is used in particular for motor vehicles, and in this context, is used primarily for driving maneuvers at low speeds, for example, when parking in a parking space. Components jutting out on any side of the vehicle beyond the remaining contour of the vehicle may be taken into account. In the following, the present invention is explained in terms of an exemplary embodiment in which components are mounted on the rear of the vehicle so that they jut out beyond the bumper.

Figure 1:
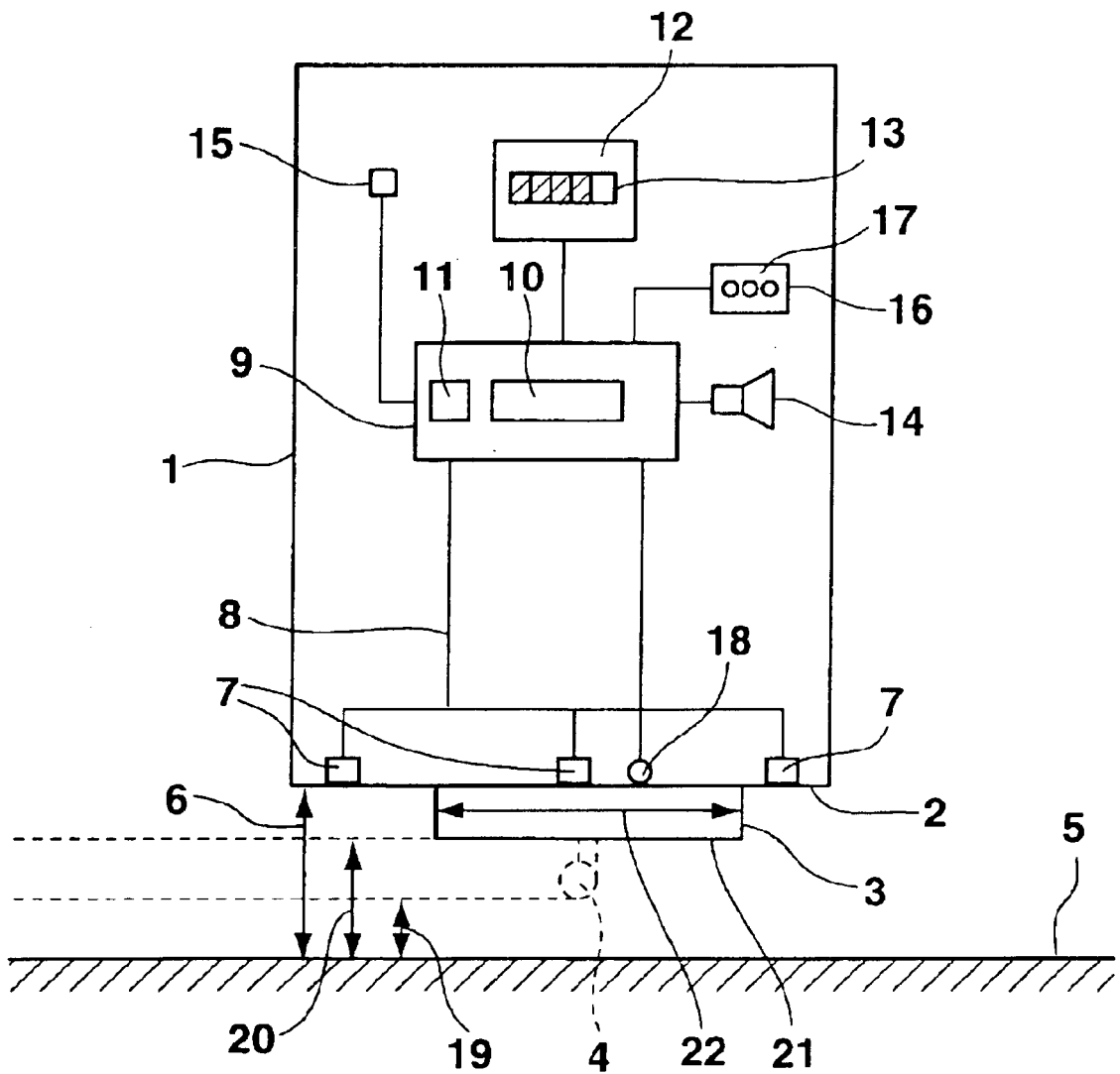
FIG. 1 shows a top view of a schematic representation of a vehicle at an obstacle.

FIG. 1 shows a motor vehicle 1, on whose vehicle rear 2 a spare wheel 3 is mounted that, in a top view as shown in FIG. 1, projects beyond a bumper forming and terminating vehicle rear 2. Optionally, a trailer hitch 4, shown with a dotted line in FIG. 1, may additionally project beyond vehicle rear 2. Motor vehicle 1 is aligned with its vehicle rear 2 parallel to a house wall 5. Vehicle rear 2 has a first distance 6 to house wall 5. Arranged on vehicle rear 2 are three sensors 7 preferably implemented as ultrasonic sensors. Sensors 7 emit a sound signal which, in the case here, is reflected by house wall 5 and received again by sensors 7. From the propagation time which the sound signal needs for the path from vehicle rear 2 to house wall 5 and back, it is possible to calculate the distance of vehicle rear 2 to house wall 5 on the basis of the sound velocity. On one hand, the calculation may be carried out in sensors 7 themselves, so that the distance data is passed on via data lines 8 to an evaluation unit 9 in motor vehicle 1. In another exemplary embodiment, it is also possible to pass on only the measurement data to evaluation unit 9, which then determines first distance 6 between motor vehicle 1 and house wall 5 from the transmitted measurement data. Evaluation unit 9 has a processing unit 10 for evaluating the measured distance data. Evaluation unit 9 also has a memory unit 11 in which a minimum distance of the motor vehicle to possible obstacles is stored. In one preferred specific embodiment, one such minimum distance is stored in memory unit 11 for each side of the vehicle. Optionally, for each vehicle side, a contour profile may also be determined which describes the vehicle surface. Evaluation unit 9 is connected to a display unit 12 in which the distance values between the motor vehicle and obstacles in the vicinity of the motor vehicle are represented. In the exemplary embodiment shown here, various colored fields are provided in a bar display 13 which increasingly light up corresponding to an approach to an obstacle. In another specific embodiment, the distance to an obstacle may also be output by a digital display of the distance value in meters, centimeters or another suitable unit of length. In a further specific embodiment, the vehicle may also be depicted in a calculated top-view representation according to FIG. 1 in relation to obstacles in the vicinity. Display unit 12 may take the form of an LED display. However, in another specific embodiment, the display may also be integrated into an instrument cluster having a plurality of displays in front of the driver in the motor vehicle. Moreover, insertion into a screen is also possible, which is either likewise arranged in the instrument cluster or in a center console of the motor vehicle.

Moreover, evaluation unit 9 is connected to a loudspeaker 14 which, in response to an increasing approach of motor vehicle 1 to an obstacle and/or if there is a drop below the minimum distance, outputs an acoustical warning signal to the driver. Optionally, a mileage sensor 15 may be connected to evaluation unit 9 for monitoring the distance measurement, in that a distance covered is compared to a change in the measured distance values. To control the evaluation unit, an operating unit 16 having suitable operating elements 17, e.g. push buttons or rotary knobs, is connected to evaluation unit 9. For reasons of clarity, FIG. 1 shows only those sensors which are arranged on the rear side of the vehicle. Over and above that, however, sensors may also be arranged on the remaining sides of the vehicle which are able to detect a specific approach of obstacles coming close to the vehicle on these sides.

A sensor 18 is also provided which is used to detect whether spare wheel 3 is mounted on motor vehicle 1. If neither trailer hitch 4 is secured to the vehicle nor does sensor 18 detect that spare wheel 3 is mounted, then the driver of the vehicle is only prompted to stop the vehicle when vehicle side 2 has approached house wall 5 up to a minimum distance 19. If, on the other hand, sensor 18 detects that the spare wheel which projects beyond vehicle rear 2 is mounted, then processing unit 10 will take the dimensions of spare wheel 3 into account for determining the distance and already output a warning when a front side 21 of spare wheel 3 has approached obstacle 5 up to minimum distance 19. The dimensions of spare wheel 3 are stored in memory unit 11. An indication of the minimum distance to the obstacle or a prompting to stop the vehicle is therefore already output when the bumper of vehicle rear 2 has reached second distance 20 which is indeed less than first distance 6, but greater than minimum distance 19. The distances are in each case marked in in FIG. 1 as arrows to the drawn-in lines, the lines running parallel to house wall 5.

For the dimensions of spare wheel 3, on one hand, the distance of a front side 21 of the spare wheel to vehicle rear 2 is important; on the other hand, however, a width 22 of spare wheel 3 is also important, since this may be significant if vehicle rear 2 approaches house wall 5 at an angle or when driving up to a very narrow obstacle. On one hand, the dimensions of spare wheel 3 may be stored in memory unit 11 by a service station or by the vehicle manufacturer. In another specific embodiment, it is also possible for a user, using operating elements 17 of operating unit 16, to transmit to evaluation unit 9 the corresponding dimensions, which are stored in memory unit 11. With this input, display unit 12 is preferably used for confirming the input.

In addition, trailer hitch 4 may be mounted on motor vehicle 1. In the exemplary embodiment shown here, trailer hitch 4 is that component which projects even beyond spare wheel 3. Therefore, in the position shown in FIG. 1, the motor vehicle has already reached minimum distance 19 to house wall 5. Already in the position shown, the warning that the minimum distance has been reached is output via display unit 12 or loudspeaker 14 to a driver of motor vehicle 1. In one preferred specific embodiment, it is taken into account that the extension of trailer hitch 4 is less than the width of spare wheel 3 or of the bumper. Therefore, a warning taking into account projecting components is only output when an obstacle in a vicinity of the trailer hitch, thus, for example, in a 20 cm wide region around the vehicle middle, gets closer to the vehicle rear.

Figure 2:
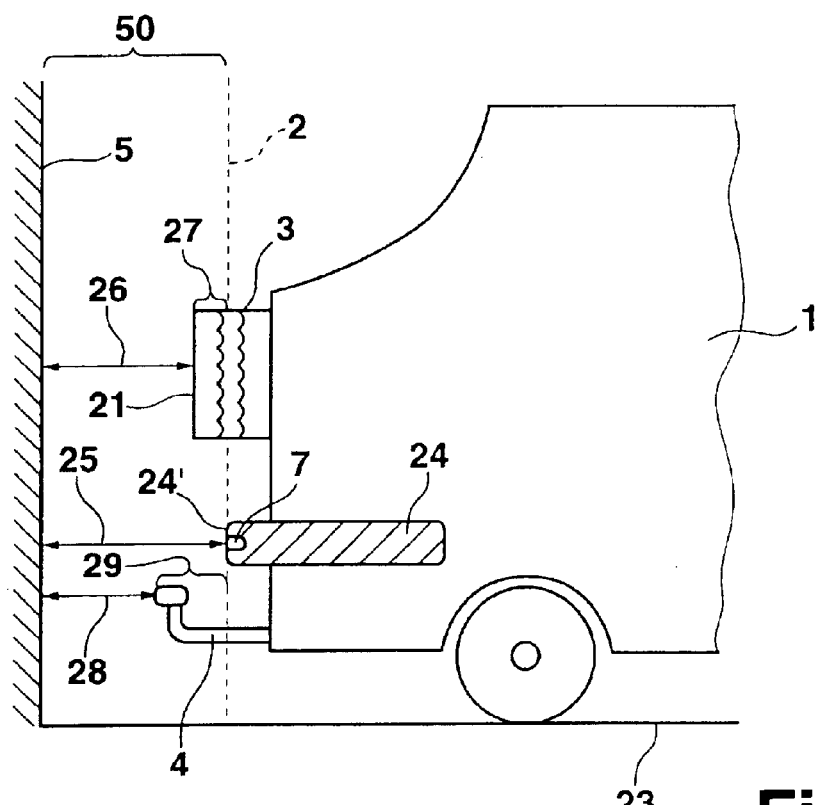
FIG. 2 shows a side view of the vehicle according to FIG. 1.

FIG. 2 shows motor vehicle 1 according to FIG. 1 in a side view, in which motor vehicle 1 is moving on a driving surface 23. Sensors 7 are arranged on a front side 24' of a bumper 24. Therefore, front side 24' of the bumper at the same time forms extreme vehicle rear 2. A double arrow denotes a first distance 25 of motor vehicle 1 to house wall 5 for the case when neither spare wheel 3 nor trailer hitch 4 are mounted on motor vehicle 1. A position of vehicle rear 2 is represented by a dotted line perpendicular to driving surface 23 and parallel to house wall 5 likewise running perpendicular to the driving surface. Over the entire width of motor vehicle 1, the space enclosed by house wall 5 and the line of vehicle rear 2 forms a region 50 between the obstacle and the detecting device, thus sensors 7, which, in accordance with its arrangement at front side 24' of bumper 24, borders directly on this space. If, at this point, spare wheel 3 is mounted in an upper region on vehicle rear 2, then a piece of spare wheel 3 juts into region 50 between the line of vehicle rear 2 and house wall 5. Thus, spare wheel 3 enlarges the extension of motor vehicle 1 in the direction of house wall 5, which represents the obstacle in the present case. The distance between motor vehicle 1, to which spare wheel 3 now also belongs, and house wall 5 is thereby reduced to second distance 26 represented correspondingly as a double arrow. In this case, the physical measuring result of sensors 7 is not changed, since they are still measuring first distance 25 to house wall 5. However, evaluation unit 9 takes into account the dimensions of spare wheel 3, stored in memory unit 11, accordingly. This may be done in two ways with the same result: Either the value of a minimum distance to be observed is increased by a length difference 27 between front side 21 of spare wheel 3 and the line of vehicle rear 2, or first distance 25 is reduced by length difference 27 in order to obtain the actual distance to house wall 5. Both processing methods lead to the same result, namely, that an acoustical and/or visual warning is output earlier prior to reaching the minimum distance, and/or that a corresponding display of the instantaneous distance is changed, taking the dimensions of spare wheel 3 into account, and optionally a smaller distance value is displayed. The same holds true for the case when trailer hitch 4 is attached to the motor vehicle, the trailer hitch projecting even beyond spare wheel 3 in the present exemplary embodiment. This results in an actual distance between motor vehicle 1 and house wall 5 which, compared to first distance 25, is now reduced to a third distance 28 shortened by a section 29 between the trailer head ball and the line of vehicle rear 2.

Instead of the arrangement of three sensors shown in the exemplary embodiment according to FIGS. 1 and 2, it is also possible to arrange only one sensor on the relevant vehicle side, accompanied by a corresponding reduction in measuring accuracy. The number of sensors on a vehicle side may also be correspondingly increased. Instead of the house wall as a massive obstacle, obstacles may also be detected which do not have the entire vehicle width, for example, poles of traffic signs. In this case, however, the detecting method remains the same with respect to the method for approaching house wall 5.

Figure 3:
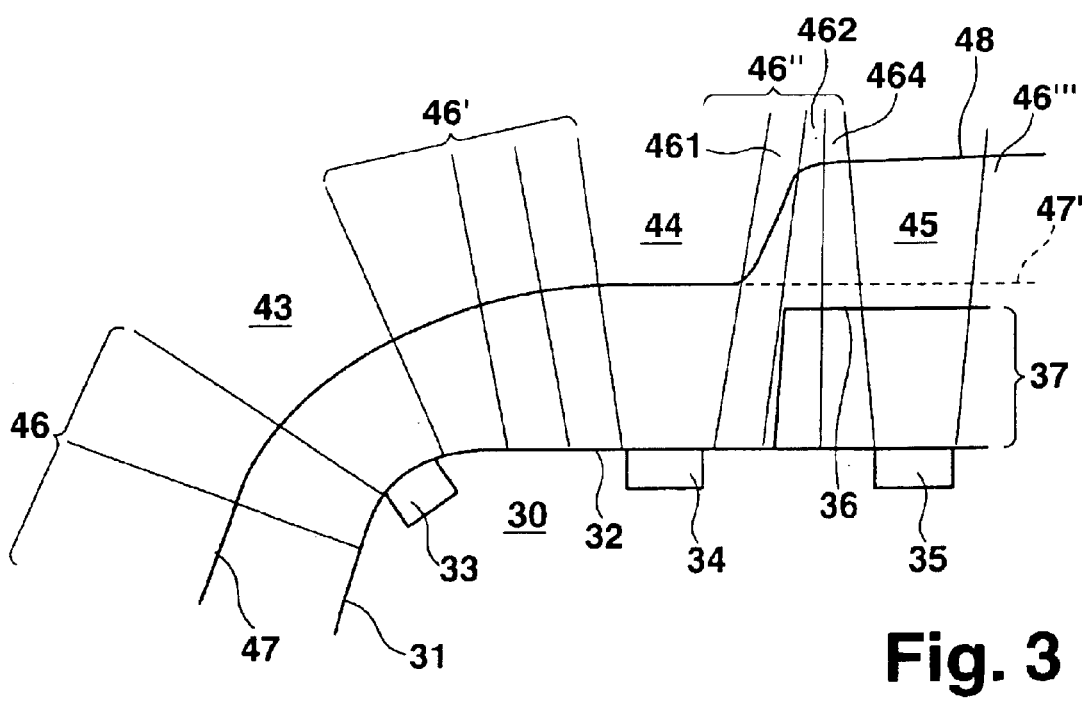
FIG. 3 shows a top view of a detail of a further exemplary embodiment of the present invention in the region of the vehicle bumper.

FIG. 3 shows an exemplary embodiment for determining the distance values using a plurality of sensors. To that end, FIG. 3 shows a corner of a vehicle bumper 30 in detail. A first sensor 33 is arranged in a corner region between a first vehicle side 31 and a second vehicle side 32. A second sensor 34 and a third sensor 35 are arranged on second vehicle side 32 formed as the vehicle rear. Rising above second vehicle side 32 is a spare wheel whose outer contour 36 projects beyond second vehicle side 32.

The vehicle surroundings are divided into individual zones which are detected differently by sensors 33, 34, 35. A first zone 43 is assigned to first sensor 33 in its central beam region in which first sensor 33 itself directly receives emitted, reflected signals again, without their reaching one of the other sensors. Sensor 34 also has a corresponding second zone 44, and third sensor 35 has a third zone 45 in front of the respective sensors. Provided in between are transition zones 46, 46', 46" in which the two sensors arranged next to the zones in each case receive the signal reflected from an obstacle in one of these zones. Zone 46" is subdivided into three subzones 461, 462, 464, it being determined separately for each subzone whether an obstacle has gotten into the subzone.

Each zone is assigned a first minimum distance 47 which, in accordance with the outer contour of the bumper, runs parallel at a predefined distance to the vehicle, e.g., at a distance of 30 cm. The correction of the measurement is not limited to a correction of one offset value, but rather, in one preferred specific embodiment, a correction is implemented for all measured distance values of an obstacle.

If spare wheel 37 is not mounted on the motor vehicle, then first minimum distance 47', drawn in with a dotted line, is determined for subzones 461, 462 and 464 situated in the region of the possible mounting position of the spare wheel. If, on the other hand, spare wheel 37 is mounted on the vehicle and this is detected automatically via sensor 18 or is communicated to evaluation unit 9 via operating unit 16, then a corrected minimum distance 48 which is larger than first minimum distance 47' and, for example, amounts to 60 cm at its maximum, is determined as a minimum distance for all affected zones in which spare wheel 3 projects beyond bumper 30. For the evaluation, the difference between first minimum distance 47' and corrected minimum distance 48 is either added as an offset to the minimum distance or subtracted from the measured distance value.

In a first specific embodiment, the predefined distance may jump between first minimum distance 47' and corrected minimum distance 48 predefined by spare wheel 37. However, particularly when driving up to smaller obstacles, this may lead to a sudden jump in the minimum distance, and therefore to a sudden jump in the case of the warning when the obstacle changes from one zone into an adjacent zone. Therefore, in the exemplary embodiment shown here, with subzone 461, a transition zone is provided in which a smooth adaptation to the contour of spare wheel 37 is made possible. A linear transition is preferably made between first minimum distance 47', which is predefined by the shape of the bumper, and corrected minimum distance 48 determined by spare wheel 37. Because of this, sudden jumps in the minimum distance do not take place when approaching an obstacle, particularly in this region. In another specific embodiment, it is also possible to provide a plurality of constant, different distance values which, however, differ slightly, so that only small jumps occur at the borders of the zones.

In the exemplary embodiment shown here, individual straight-running zones are defined which do not intersect. However, the zone profile may be selected as desired and is a function of the arrangement of the sensors in the bumper and the evaluation of the received signals in evaluation unit 9. It is also possible, however, to instead define intersecting zones. In so doing, care must be taken that in the case of a cross measurement, a distance perpendicular, i.e. normal to a vehicle surface is not measured, but rather, from the signal value running at an angle to the surface, the measured distance must still be converted into a distance according to a normal with respect to the vehicle surface. Corresponding to the warning threshold shown in FIG. 3 and predefined by minimum distances 47, 48, in each case further warning thresholds may be provided, preferably parallel to minimum distances 47, 48 with greater distance to the vehicle, which, as a function of distance, warn the driver, in accordance with the distance allocated to the specific warning threshold, of an obstacle coming closer to the vehicle.

Analogous to the zone assignment, a location (spatial) assignment of a corresponding obstacle is also possible using a detecting device suitable for this purpose: For example, in the embodiment presented above, the position of a traffic sign may be assigned to one or a maximum of two zones. The position of the traffic sign may therefore be indicated to the driver in accordance with the zone distribution.

It is also possible to provide each obstacle with a distance and an angle as a spatial coordinate. Generally, a plurality of sensors is necessary to carry out such a measurement. Optionally, suitable Cartesian coordinates may be used which indicate a position of the obstacle in relation to driving surface 23 in comparison to motor vehicle 1. Exact tracking of the obstacle by the driver and/or by evaluation unit 9 is thereby made possible. In contrast, the zone division indicated in FIG. 3 permits reduced computing expenditure, since here, in each case an obstacle is only assigned to a zone.

What is claimed is:

1. A distance-measuring device for a vehicle comprising:
   at least one detecting device for measuring a distance between the detecting device and an obstacle;
   a memory unit for storing dimensions of at least one part that is mounted on the vehicle and that projects into a space between the detecting device and the obstacle;
   an evaluation unit for evaluating data of the detecting device and for generating a warning for a driver of the vehicle as a function of a distance between the vehicle and the obstacle,
   wherein the distance between the vehicle and the obstacle is determined from the stored dimensions of the part mounted on the vehicle and from the measured distance between the detecting device and the obstacle.

2. The device according to claim 1, further comprising a sensor for detecting whether the part projecting into the space between the detecting device and the obstacle is mounted on the vehicle, the dimensions of the part being taken into account for determining the distance between the vehicle and the obstacle when the part is detected by the sensor, and the dimensions not being taken into account for determining the distance between the vehicle and the obstacle when the part is not detected by the sensor.

3. The device according to claim 1, wherein the detecting device includes a plurality of individual sensors whose data are able to be evaluated, at least one of individually and separately.

4. The device according to claim 3, wherein zones are allocated to the individual sensors and as a function of the dimensions of the part projecting into the space between the vehicle and the obstacle, each of the zones is allocated an offset value which is one of (a) subtracted from the measured distance between the detecting device and the obstacle and (b) added to a minimum distance to be observed.

5. The device according to claim 1, wherein the detecting device includes sensors for sending out at least one of an electromagnetic and acoustical signal, for receiving a reflected signal and for determining a propagation time of the signal in order to determine the distance from the propagation time.

6. The device according to claim 5, wherein the signal is an untrasound signal.

7. A method for measuring a distance between a vehicle and an obstacle, the method comprising:
   measuring, with a detecting device, a distance between the detecting device and the obstacle; and
   storing dimensions of at least one part mounted on the vehicle and extending into a space between the detecting device and the obstacle, a distance between the part mounted on the vehicle and the obstacle being determined as the distance between the vehicle and the obstacle from the distance between the detecting device and the obstacle, taking into account the dimensions of the part.

8. The method according to claim 7, further comprising automatically detecting the at least one part, the dimensions of the part being taken into account automatically for the distance measurement.

9. The method according to claim 7, further comprising outputting a warning in response to a drop below a minimum distance between the vehicle and the obstacle.

10. The method according to claim 7, further comprising:
    detecting, with individual sensors of the detecting device, a distance to the obstacle by zone;
    assigning each zone an offset value as a function of the dimensions of the part; and
    one of (a) subtracting the offset value from the measured distance between the detecting device and the obstacle and (b) adding the offset value to a predefined minimum distance to the obstacle to be observed.

11. The method according to claim 10, wherein a specific minimum distance to the obstacle is predefined for each zone.

* * * * *